United States Patent
Gong et al.

(10) Patent No.: US 8,564,253 B2
(45) Date of Patent: Oct. 22, 2013

(54) CITY ELECTRIC BUS POWERED BY ULTRACAPACITORS

(75) Inventors: Zhengda Gong, Yangzhou (CN); Quanshun Liang, Yangzhou (CN); Li Hua, Shanghai (CN); Xiao Li Miao, Shanghai (CN); Jianpo Heng, Shanghai (CN)

(73) Assignee: Sinautec Automobile Technologies, LLC, Arlington, VA (US)

( * ) Notice: Subject to any disclaimer, the term of this patent is extended or adjusted under 35 U.S.C. 154(b) by 528 days.

(21) Appl. No.: 12/644,535

(22) Filed: Dec. 22, 2009

(65) Prior Publication Data

US 2010/0270983 A1 Oct. 28, 2010

(30) Foreign Application Priority Data

Apr. 24, 2009 (CN) .......................... 2009 1 0057119
Apr. 24, 2009 (CN) .......................... 2009 1 0057120

(51) Int. Cl.
*H02J 7/00* (2006.01)
*H02J 7/04* (2006.01)
*B60M 1/34* (2006.01)

(52) U.S. Cl.
USPC .......................... 320/167; 320/150; 191/23 A (58) Field of Classification Search
USPC .................. 320/150, 167; 191/23 A
See application file for complete search history.

(56) References Cited

U.S. PATENT DOCUMENTS

| | | | | |
|---|---|---|---|---|
| 6,557,476 | B2* | 5/2003 | Batisse | 104/289 |
| 6,788,027 | B2* | 9/2004 | Malik | 320/134 |
| 8,324,858 | B2* | 12/2012 | Hill et al. | 320/109 |
| 2005/0038581 | A1* | 2/2005 | Kapolka et al. | 701/29 |
| 2008/0106239 | A1 | 5/2008 | Cegnar | |
| 2008/0186750 | A1 | 8/2008 | Gilmore | |
| 2009/0015199 | A1* | 1/2009 | Kitanaka | 320/118 |

FOREIGN PATENT DOCUMENTS

| | | |
|---|---|---|
| CN | 201153267 | 11/2008 |
| JP | 2002150271 | * 5/2002 |

OTHER PUBLICATIONS

"iCAN System Overview," available at http://www.icansys.org/xitong.asp (last visited Dec. 4, 2009) (3 pages).
"The physical layer and transmission media," available at http://www.icansys.org/xitong/xitong_02.asp (last visited Dec. 4, 2009) (4 pages).
"iCAN agreement," available at http://www.icansys.org/xitong/xitong_03.asp (last visited Dec. 4, 2009) (2 pages).

(Continued)

*Primary Examiner* — Richard V Muralidar
(74) *Attorney, Agent, or Firm* — Proskauer Rose LLP (57) ABSTRACT

Described are a method and apparatus for charging an electric vehicle powered by ultracapacitors. The vehicle includes a current collector device for collecting power from an external power source, an electric motor module for providing a driving force to the vehicle, an ultracapacitor module, and a charger device. The ultracapacitor module includes one or more ultracapacitors. The ultracapacitor module is coupled to the current collector device for receiving power and is coupled to the electric motor module for providing power. The charger device is connected to the current collector, the ultracapacitor module, and to a temperature signal associated with one or more of the one or more ultracapacitors. The charger device is configured to adjust power supplied to the ultracapacitor module based on the temperature signal.

14 Claims, 4 Drawing Sheets

(56) References Cited

OTHER PUBLICATIONS

"iCAN Protocol (1)-CAN messages using rules," available at http://www.icansys.org/xitong/xitong_03_01.asp (last visited Dec. 4, 2009) (2 pages).

"iCAN Agreement (2)—Data communications," available at http://www.icansys.org/xitong/xitong_03_02.asp (last visited Dec. 4, 2009) (3 pages).

"iCAN Agreement (3)—Equipment Description and Access Methods," available at http://www.icansys.org/xitong/xitong_03_03.asp (last visited Dec. 4, 2009) (2 pages).

"iCAN Agreement (4)—Network Management," available at http://www.icansys.org/xitong/xitong_03_04.asp (last visited Dec. 4, 2009) (2 pages).

"iCAN Master," available at http://www.icansys.org/xitong/xitong_04.asp (last visited Dec. 4, 2009) (2 pages).

"ARM platform iCAN Master," available at http://www.icansys.org/xitong/xitong_04_1.asp (last visited Dec. 4, 2009) (2 pages).

"ARM platform iCAN Master," available at http://www.icansys.org/xitong/xitong_04_2.asp (last visited Dec. 4, 2009) (5 pages).

"iCAN Device Model," available at http://www.icansys.org/xitong/xitong_05.asp (last visited Dec. 4, 2009) (2 pages).

"iCAN System Application Forms," available at http://www.icansys.org/xitong/xitong_06.asp (last visited Dec. 4, 2009) (5 pages).

"iCAN system components," available at http://www.icansys.org/xitong/xitong_06_1.asp (last visited Dec. 4, 2009) (2 pages).

"iCAN System Expansion," available at http://www.icansys.org/xitong/xitong_07.asp (last visited Dec. 4, 2009) (4 pages).

"Expansion of the network topology," available at http://www.icansys.org/xitong/xitong_07_1.asp (last visited Dec. 4, 2009) (2 pages).

"Expand communication," available at http://www.icansys.org/xitong/xitong_07_2.asp (last visited Dec. 4, 2009) (2 pages).

"To connect to other fieldbus network," available at http://www.icansys.org/xitong/xitong_07_3.asp (last visited Dec. 4, 2009) (2 pages).

\* cited by examiner

CITY ELECTRIC BUS POWERED BY ULTRACAPACITORS

RELATED APPLICATIONS

This application claims the benefit of and priority to Chinese Patent Application Nos. 200910057119.1 and 200910057120.4, each filed on Apr. 24, 2009, the disclosures of which are incorporated herein by reference in their entirety.

FIELD OF THE INVENTION

The present invention relates generally to a method and an apparatus for operating an ultracapacitor powered vehicle.

BACKGROUND

Figure 1:
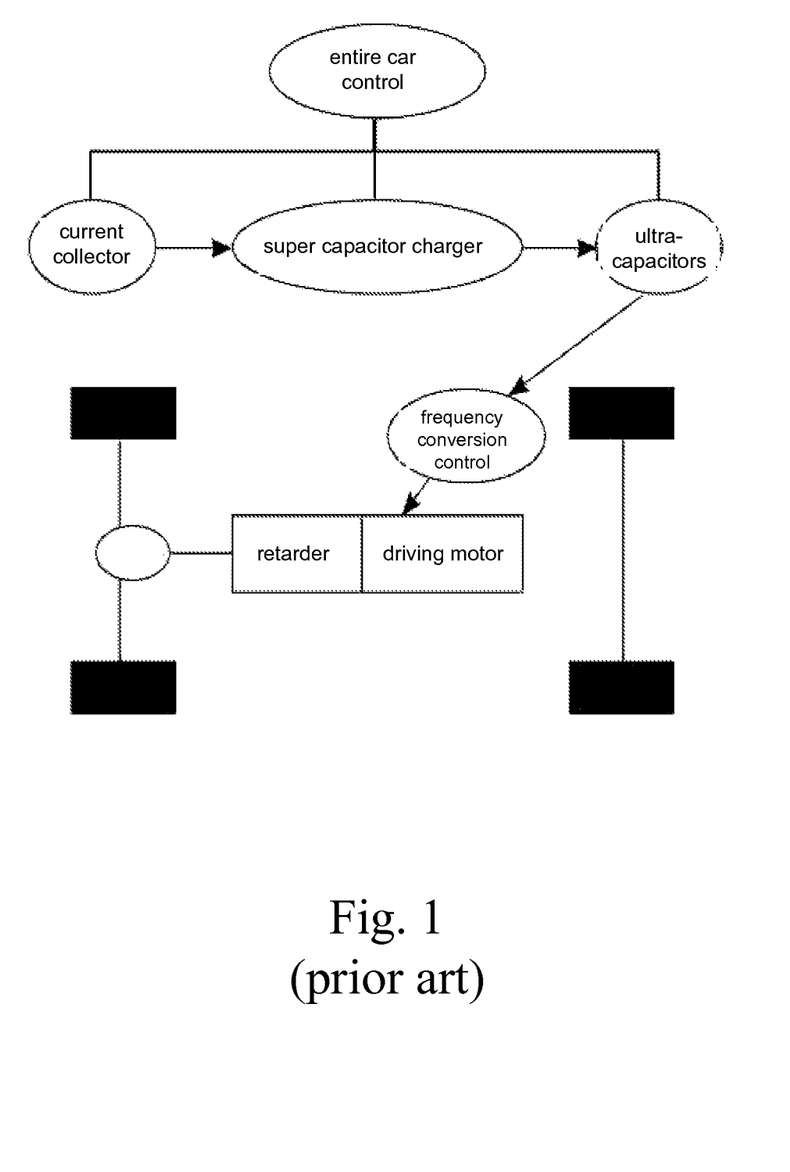
FIG. 1 illustrates a block diagram of typical ultracapacitor powered buses.

Existing ultracapacitor powered buses or automobiles are driven by electric energy stored in ultracapacitors. The ultracapacitor also supplies power to assisting operating devices. The fundamental principles are similar to those of the trolleybus, as is shown in FIG. 1. Vehicles powered by ultracapacitors can charge when they are stopped at stations (e.g., bus stations) in a traffic system. When the ultracapacitor needs to charge, it can utilize the existing rectified DC network for trolleybuses as the power source or, after reducing (or lifting) voltage and rectifying, can utilize an AC network as the power source. Because ultracapacitors have high charge acceptance, through rapid charger, the charging process can be finished within tens of seconds while the vehicle or bus stops at the station and loads passengers. Therefore, buses powered by ultracapacitor can be suitable for city public traffic systems that have fixed routes. The system is electric-powered, can have zero-tail-gas-emissions and zero-pollution. It can be used in numerous scenarios including, but not limited to, fixed public traffic routes such as short-distance large passenger-flow routes in downtown areas and/or passenger transport systems for airport, dock, tourist resorts and/or residential districts.

SUMMARY OF THE INVENTION

In currently available technologies, ultracapacitor powered buses are transformed from trolley buses by adding ultracapacitors and AC frequency converter gearing devices. The typical charging voltage range for individual ultracapacitors is 0.9-1.4 Volts. In addition, ultracapacitors can only store a small amount of energy and the full charge endurance is low. Currently available ultracapacitor powered buses do not take full advantage of ultracapacitors storing ability. In some aspects, the invention is directed to curing the deficiency of the currently available ultracapacitor technologies by taking full advantage of ultracapacitor storing ability to increase the full charge endurance and improve the control of the entire bus.

One approach to charging ultracapacitors in an electric vehicle powered by ultracapacitors is to use temperature feedback. The invention, in one aspect, includes an electric vehicle powered by ultracapacitors. The vehicle includes a current collector device for collecting power from an external power source, an electric motor module for providing a driving force to the vehicle, an ultracapacitor module and a charger device. The ultracapacitor module includes one or more ultracapacitors. The ultracapacitor module is coupled to the current collector device for receiving power and is coupled to the electric motor module for providing power. The charger device is connected to the current collector, the ultracapacitor module, and to a temperature signal associated with one or more of the one or more ultracapacitors. The charger device is configured to adjust power supplied to the ultracapacitor module based on the temperature signal.

In another aspect, there is a method for charging an electric vehicle powered by ultracapacitors. The method includes receiving power, via a current collector device, from an external power source. The method also includes measuring one or more temperature values of one or more ultracapacitors in an ultracapacitor module connected to an electric motor. The method also includes charging the one or more ultracapacitors with power received from the external power source, wherein charging the one or more ultracapacitors is based on the one or more temperature values.

In other examples, any of the aspects above can include one or more of the following features. In some embodiments, the vehicle can further include a distributed ultracapacitor monitoring system. The vehicle can further include a controller area network (CAN) device. The CAN device can be configured to communicate using the SAEJ1939 protocol. The vehicle can further include an electric bus pantograph supporting the current collector device. The vehicle can further include a camera positioned to monitor the electric bus pantograph and connected to a controller area network (CAN) device. The ultracapacitor module can further be coupled to one or more additional electric devices for providing power. The charger device can include a IGBT device and a control device. The IGBT device can be connected to the current collector and the ultracapacitor module. The control device can be connected to the temperature signal and the IGBT device. The control device can be configured to adjust the power delivered by the IGBT device to the ultracapacitor module based on the temperature signal. The control device can be configured to decrease, using the IGBT device, an upper limit of charging voltage of the ultracapacitor module when the temperature signal indicates an increase in temperature. The control device can be configured to decrease the upper limit of charging voltage when the temperature signal indicates a temperature higher than 25° C. The control device can be configured to increase, using the IGBT device, an upper limit of charging voltage of the ultracapacitor module when the temperature signal indicates a decrease in temperature. The control device can be configured to increase the upper limit of charging voltage when the temperature signal indicates a temperature lower than 25° C. The upper limit of charging voltage can be between 580 volts and 640 volts.

Other aspects, examples, and advantages of the present invention will become apparent from the following detailed description, taken in conjunction with the accompanying drawings, illustrating the principles of the invention by way of example only.

BRIEF DESCRIPTION OF THE DRAWINGS

The foregoing and other features and advantages of the present invention, as well as the invention itself, will be more fully understood from the following description of various embodiments, when read together with the accompanying drawings.

DETAILED DESCRIPTION

Figure 2:
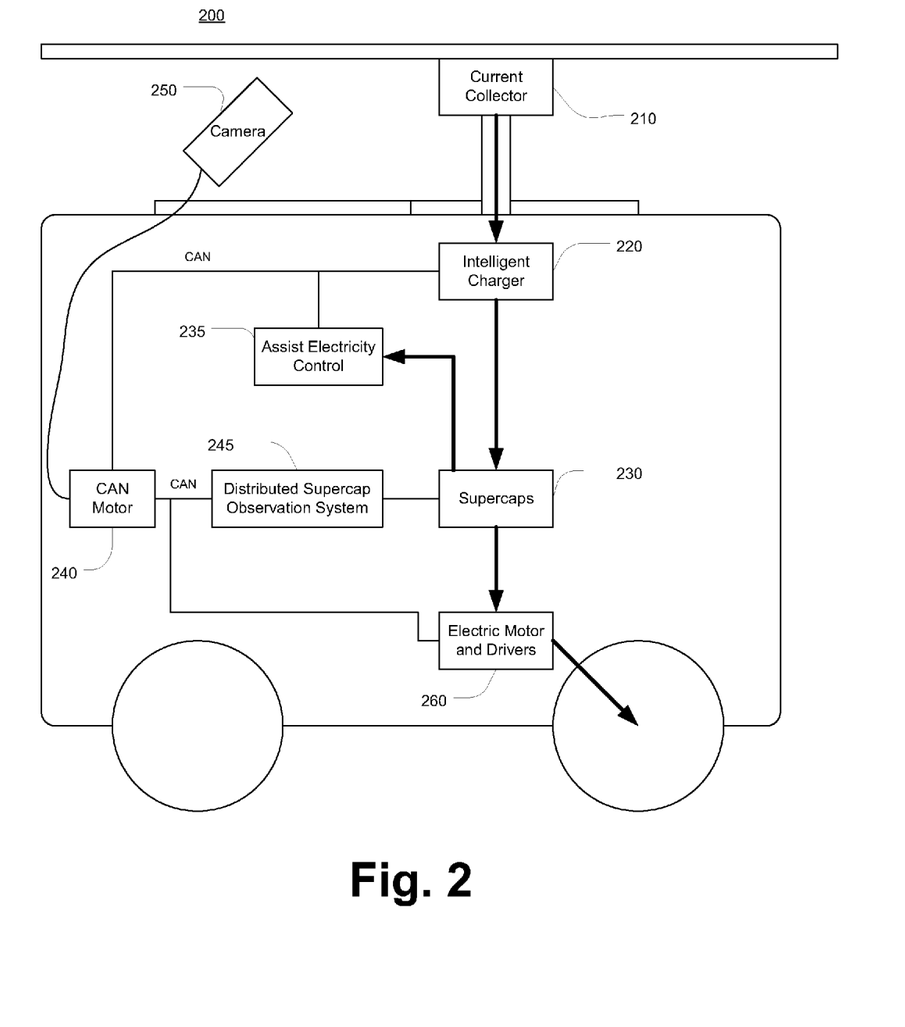
FIG. 2 illustrates a block diagram of an ultracapacitor powered bus, according to an illustrative embodiment of the invention.

FIG. 2 illustrates a block diagram of an ultracapacitor powered bus 200, according to an illustrative embodiment of the invention. While FIG. 2 illustrates a bus, other configurations are possible. For example, in some embodiments, ultracapacitors can be used in any vehicle or mobile driven device including, but not limited to, cars, trucks, trains, boats, etc. The bus 200 can include a body structure (not shown), current collector device 210 connected to a pantograph, an intelligent charger module 220, an ultracapacitor module 230, additional electric control units 235, a CAN instrument 240, a distributed ultracapacitor monitoring system 245, a camera 250, and an electric motor and driver module 260. The current collector device 210 can be raised on a pantograph at, for example, bus stops while passengers unload and load. For example, the drive can manually, via a control interface, raise the pantograph or the bus can automatically detect when it is near a charging station (e.g., via a bluetooth signal) and have the pantograph raised. More generally, current collector device 210 can be any device that can connect to a power source to charge the ultracapacitor bus system 200. The current collector device 210 can provide electrical power to the ultracapacitor module 230 via current and/or voltage on one or more electrical connections. Two or more elements of the bus system 200 can be connected together using a controller area network (CAN).

In some embodiments, CAN instruments can be based on the SAE J1939 protocol, which can realize real-time communication between every electric control unit (e.g., intelligent charger, distributed ultracapacitor monitoring system, electric motor and driver, etc.) via a CAN-bus. The system can be highly intelligent, precisely measured, highly stable and have the ability of responding in real time. The camera 250 can monitor the bus' pantograph and send video signals to the CAN instrument 240.

The ultracapacitor module 230 can include one or more ultracapacitors, which provide power to drive the bus. The ultracapacitor module 230, as the power source, is connected to the electric motor and driver module 260. In some embodiments, the ultracapacitor module 230 can also provide power to one or more additional electronic units on the bus such as, for example, power steering unit, air conditioner unit, anti-lock braking system, pneumatic brake unit, car lights, wipers, and/or other electrical units.

The ultracapacitor module 230 is connected to the intelligent charger module 220 and can be connected to the distributed ultracapacitor monitoring system 245.

Figure 3:
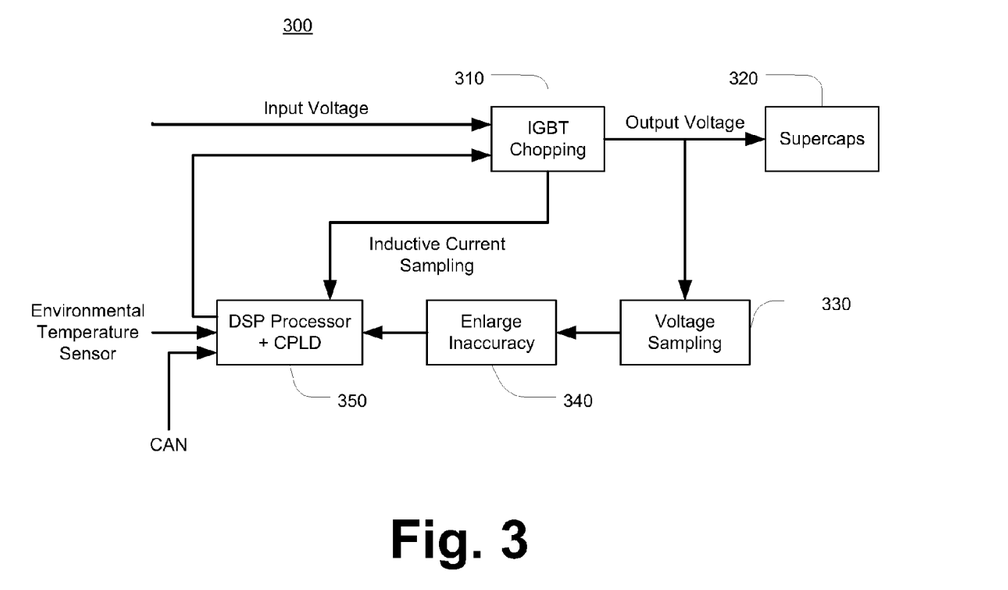
FIG. 3 illustrates a block diagram of an intelligent charger, according to an illustrative embodiment of the invention.

FIG. 3 illustrates a block diagram 300 of the intelligent charger 220 of FIG. 2, according to an illustrative embodiment of the invention. An input voltage from the current collector device 210 can be provided to an IGBT device 310. The IGBT device 310 can chop a power signal and provide one or more outputs to the ultracapacitor module 320. The IGBT device can also be based on step-down charge technology and use a charging mode of limiting the constant voltage output. The output signal from the IGBT device can be sampled by a sampling device 330 and can be amplified by amplifier 340. A control device 350 can provide a control signal to the IGBT device 310 that controls the level of charging that the IGBT device 310 provides to the ultracapacitor module 320. The control device 350 can take as input the amplified signal from the amplifier 340, an inductive current sampling from the IGBT device 310, one or more temperature signals from the ultracapacitor module 230, and/or other control signals from the CAN network. For example, in some embodiments, the control device 350 can operate when it receives a signal from the camera 250 indicating that the current collector device 210 has connected to an external power source.

In some embodiments, the control device 350 can be a digital signal processor (DSP) and/or a programmable logic device (e.g., CPLD). In alternative or supplemental embodiments, the control device 350 can be a proportional-integral-derivative (PID) controller. In yet other embodiments, the control device 350 can be a TMS320LF2812 from Texas Instruments. The control device 350 can control the IGBT device 310's break-over and shutoff to produce a chopped wave (e.g., it can control one or more of the frequency, duty-cycle, impulse width or other characteristics of the output voltage). The control device 350 produces a control signal based on, for example, the ambient temperature of one or more points in the ultracapacitor module 230. For example, when the ambient temperature increases, the control device 350 can reduce the upper limit charging voltage of the IGBT device 310. When the ambient temperature goes down, the control device 350 can increase the upper limit charging voltage of the IGBT device 310. By reducing the upper limit charging voltage when the temperature increases, the charging calorific value of ultracapacitor can be decreased. At the same time, the charge quantity does not decrease. Similarly, when the temperature goes down, increasing the upper limit charging voltage can increase the calorific value of ultracapacitors and can increase the charge volume of ultracapacitors.

The upper limit of the charging voltage range of an ultracapacitor module can be between 580 and 640 Volts, while the charging current range can be between 30 and 300 Amps. When a temperature sensor detects that the ambient temperature is lower than 25° C., for example, the individual capacitor can be charged to 1.58 Volts. In some embodiments, the entire bus can have 400 capacitors, resulting in a total voltage of 632 Volts. When a temperature sensor detects that the ambient temperature is higher than 25° C., for example, individual capacitor can be charged to 1.52 Volts. If the entire bus has 400 capacitors, then the total voltage will be 600 Volts. Based on the formula $E=CU^2/2$, the energy stored in the ultracapacitors will increase by 30-50% and will not influence the normal operation of ultracapacitors. Therefore, the intelligent charger 220 can advantageously automatically adjust the ultracapacitor module 230's charge voltage and current according to ambient temperature, which can result in more electric energy being stored and/or maximizing the full charge endurance.

The control device 350 can also include a complete failure protection function, a module-level fault diagnosis function, and/or minor fault automatic reset functions. The control device 350 can also use a CAN network interface to connect to a host computer for maintaining a failure log and diagnosis record.

Figure 4:
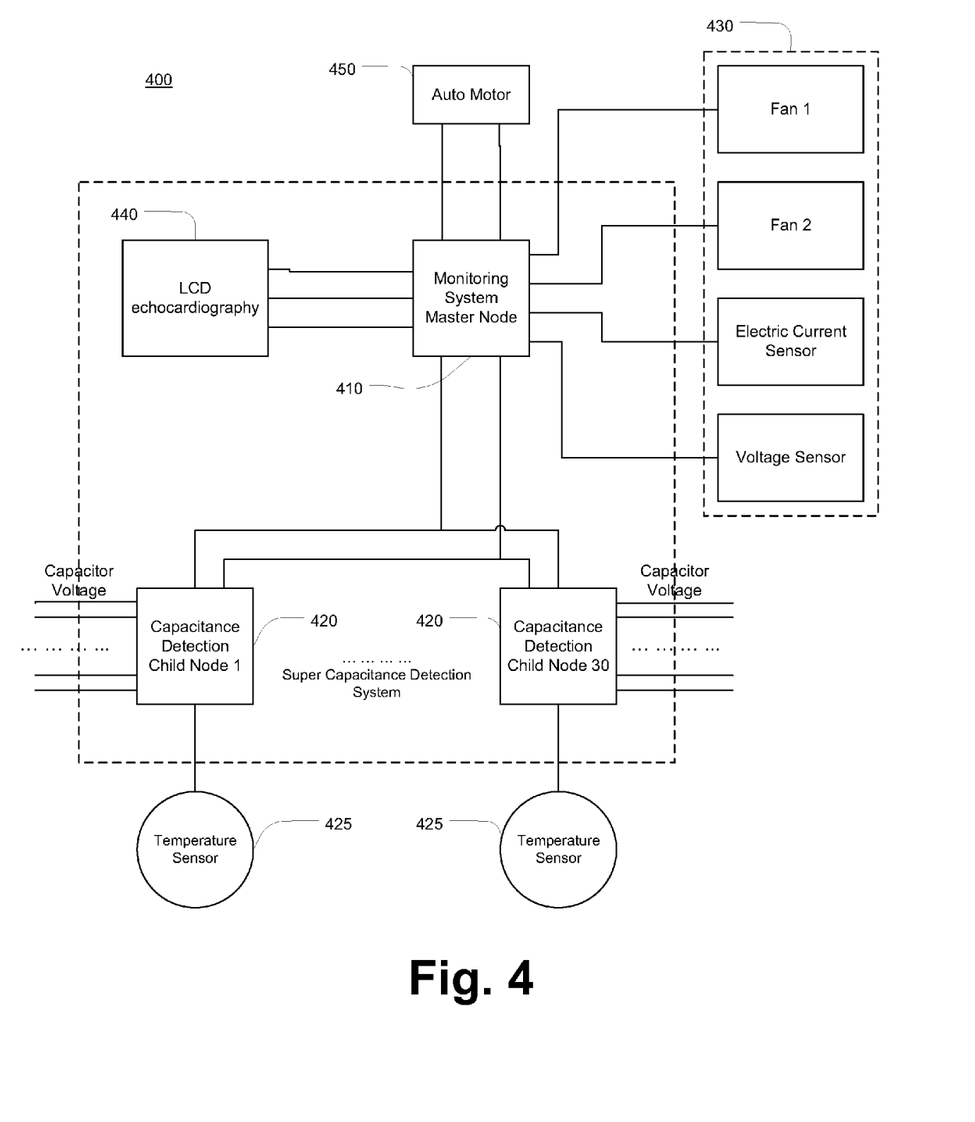
FIG. 4 illustrates a block diagram of a distributed ultracapacitor monitoring system, according to an illustrative embodiment of the invention.

FIG. 4 illustrates a block diagram of a distributed ultracapacitor monitoring system 400, according to an illustrative embodiment of the invention. The distributed ultracapacitor monitoring system 400 includes a monitoring system master node 410, one or more distributed capacitance detection child nodes 420, assisting electronic devices 430 (e.g., fans), a LCD diagnostic device 440, and/or a CAN meter 450. In some embodiments, the system 400 can include 30 child nodes 420. The distributed ultracapacitor monitoring system 400 can based on iCAN protocol, which includes a monitoring control system of host nodes. In some embodiments, being connected to every capacitor child node 420, the monitoring control system host node 410 can be linked to the vehicle instrument system 450 via CAN bus complying with the SAE J1939 protocol.

The monitored control system host node 410 can have an overall current measuring interface and an overall voltage measuring interface 430. These two interfaces can be connected to current sensor and voltage sensors, respectively, to measure the overall current and voltage of ultracapacitors in the ultracapacitor module 230. In some embodiments, the overall voltage measuring interface 430 can include a NCV1-1000V voltage sensor to measure (0-650V±5) volts d.c. In supplemental or alternative embodiments, the overall current measuring interface 430 can include a NT300-S current sensor to measure (rated current 300±3 Amps, maximum measuring range±300 Amps) direct current.

The child nodes 420 can be linked to individual ultracapacitor temperature sensors 425 to measure, for example, its surface temperature. Each child node 420 can be linked through the iCAN communication network with the host node 410. The CAN control instrument 450 can analyze and process information, give orders, and/or show the working condition of each equipment on the CAN bus. The CAN control instrument 450 can include powerful functions of fault diagnosis and, for example, inform the driver of the reason of breakdown in the first place advantageously increasing traffic safety. Diagnostic information with LCD display 440 can provide for an easy to understand interface with the driver. Through the monitoring camera of the pantograph and meter display, the driver can monitor the pantograph current collector's state to prevent errors and avoid damage caused by malfunction of the pantograph type current collector. In some embodiments, the monitored control system host node can support 320×240 single-color LCD diagnostic equipment. The LCD can be used to display system operating status, inputting alarming threshold parameters. The monitoring control system host node 410 can connect to 2 way relay dry contact output to drive two blowers 430.

Nodes 410 and 420 can include processing units that are used to process received messages and generate messages to be sent to other devices. In some embodiments, the processing units can communicate (e.g., transmit and/or receive) the messages via one or more physical ports coupled to the processing unit. Communication via the physical ports can be accomplished, for example, according to the processes standardized in a physical layer protocol, data link layer protocol, network layer protocol, hypbrid layer protocol, and/or any combination of protocols thereof (e.g., using one or more of an industrial Ethernet protocol, a SONET/SDH protocol, a CAN protocol, an ATM protocol, and/or other physical and link layer protocols).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The power stored in the ultracapacitors can be provided, for example, to power an electric motor module by passing current and/or voltage via one or more electrical wires. An electric motor module can include an electric motor that converts the received current and/or voltage to mechanical energy. Electric motors (e.g., AC, DC, and/or hybrid motors) can operate using well known techniques such as, for example, AC induction, stepper DC techniques, brushless DC techniques, and other electric motor techniques.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An electric vehicle powered by ultracapacitors, the vehicle comprising:
   a current collector device for collecting power from an external power source;
   an electric motor module for providing a driving force to the vehicle;
   an ultracapacitor module comprising one or more ultracapacitors, the ultracapacitor module providing power to the electric motor module;
   a distributed ultracapacitor monitoring system comprising:
      a distributed communication network medium including one or more transmission links,
      a master device coupled to the distributed communication network medium, including a host industrial controller area network (iCAN) processing unit for communicating iCAN control messages with the distributed communication network medium, and
      at least one child node device, each child node device including:
         a child iCAN processing unit that communicates iCAN control messages with the master device over the distributed communication medium, and
         a link to a sensor device for at least one of the one or more ultracapacitors, the plurality of ultracapacitors being coupled to the electric motor module for providing power to the electric vehicle
   a charger device comprising:
      an insulated-gate bipolar transistor (IGBT) that receives an input voltage from the current collector and supplies power comprising a chopped output voltage to the ultracapacitor module, and
      a control device that receives a temperature signal associated with at least one of the one or more ultracapacitors and transmits a power control signal to the IGBT device, wherein the control device is configured to adjust power supplied by the IGBT devices to the ultracapacitor module by adjusting the charging voltage based on the temperature signal and at least one signal from the master device.

2. The vehicle of claim 1 further comprising a controller area network (CAN) device.

3. The vehicle of claim 2 wherein the CAN device is configured to communicate using the SAEJ1939 protocol.

4. The vehicle of claim 1 further comprising an electric bus pantograph supporting the current collector device.

5. The vehicle of claim 4 further comprising a camera positioned to monitor the electric bus pantograph and connected to a controller area network (CAN) device.

6. The vehicle of claim 1 wherein the ultracapacitor module is further coupled to one or more additional electric devices for providing power.

7. The vehicle of claim 1, wherein the control device is configured to decrease, using the IGBT device, an upper limit of charging voltage of the ultracapacitor module when the temperature signal indicates an increase in temperature.

8. The vehicle of claim 7 wherein the control device is configured to decrease the upper limit of charging voltage when the temperature signal indicates a temperature higher than 25° C.

9. The vehicle of claim 7 wherein the upper limit of charging voltage is between 580 volts and 640 volts.

10. The vehicle of claim 1, wherein the control device is configured to increase, using the IGBT device, an upper limit of charging voltage of the ultracapacitor module when the temperature signal indicates a decrease in temperature.

11. The vehicle of claim 10 wherein the control device is configured to increase the upper limit of charging voltage when the temperature signal indicates a temperature lower than 25° C.

12. The vehicle of claim 1, wherein the control device comprises one of:
   a digital signal processor (DSP), a programmable logic device, or a proportional-integral-derivative (PID) controller.

13. The vehicle of claim 1, wherein the control device produces the power control signal based on the temperature signal, a voltage signal, a current signal, and at least one controller area network (CAN) signal.

14. A method for charging an electric vehicle powered by ultracapacitors, the method comprising:
   receiving, by a charger via a current collector device, an input voltage from an external power source;
   measuring, by a distributed ultracapacitor monitoring system, one or more temperature values for each of one or more ultracapacitors connected to an electric motor, the distributed ultracapacitor monitoring system comprising:
      a distributed communication network medium including one or more transmission links,
      a master device coupled to the distributed communication network medium, including a host industrial controller area network (iCAN) processing unit for communicating iCAN control messages with the distributed communication network medium, and
      at least one child node device, each child node device including:

a child iCAN processing unit that communicates iCAN control messages with the master device over the distributed communication medium, and a link to a sensor device for at least one of the one or more ultracapacitors, the plurality of ultracapacitors being coupled to the electric motor module for providing power to the electric vehicle; and charging, by the charger, the one or more ultracapacitors with a power comprising a chopped output voltage the charger comprising:

an insulated-gate bipolar transistor (IGBT) that receives an input voltage from the current collector and supplies power comprising a chopped output voltage to the ultracapacitor module, and a control device that receives a temperature signal associated with at least one of the one or more ultracapacitors and transmits a power control signal to the IGBT device, wherein the control device is configured to adjust power supplied by the IGBT devices to the ultracapacitor module by adjusting the charging voltage based on the temperature signal and at least one signal from the master device.

* * * * *